United States Patent [19]
Newell et al.

[11] Patent Number: 5,932,055
[45] Date of Patent: Aug. 3, 1999

[54] DIRECT METAL FABRICATION (DMF) USING A CARBON PRECURSOR TO BIND THE "GREEN FORM" PART AND CATALYZE A EUTECTIC REDUCING ELEMENT IN A SUPERSOLIDUS LIQUID PHASE SINTERING (SLPS) PROCESS

[75] Inventors: Kenneth J. Newell, Marina Del Rey; Ira B. Goldberg, Westlake Village, both of Calif.

[73] Assignee: Rockwell Science Center LLC, Thousand Oaks, Calif.

[21] Appl. No.: 08/967,463

[22] Filed: Nov. 11, 1997

[51] Int. Cl.$^6$ .............................. B32B 31/26; B22F 1/00; B22F 7/00
[52] U.S. Cl. .......................... 156/245; 156/62.6; 156/246; 156/264; 156/272.8; 156/308.2; 419/14; 419/37; 419/44; 419/47; 419/54
[58] Field of Search ..................................... 156/155, 264, 156/272.8, 308.2, 242, 62.2, 62.6, 245, 246; 419/14, 15, 17, 25, 36, 37, 38, 44, 47, 54

[56] References Cited

U.S. PATENT DOCUMENTS

| | | | |
|---|---|---|---|
| 4,011,077 | 3/1977 | Kaufman . | |
| 4,129,444 | 12/1978 | Dreyer et al. . | |
| 4,863,538 | 9/1989 | Deckard | 156/62.2 |
| 4,938,816 | 7/1990 | Beaman et al. | 156/62.2 |
| 4,944,817 | 7/1990 | Bourell et al. | 156/62.2 |
| 5,017,753 | 5/1991 | Deckard | 219/121.63 |
| 5,053,090 | 10/1991 | Beaman et al. | 156/62.2 |
| 5,248,475 | 9/1993 | Feldstein | 419/47 X |
| 5,289,967 | 3/1994 | Bampton et al. | 228/190 |
| 5,561,827 | 10/1996 | Reeves et al. | 419/5 |
| 5,637,175 | 6/1997 | Feygin et al. | 156/264 |
| 5,689,796 | 11/1997 | Kasai et al. | 419/36 X |
| 5,732,323 | 3/1998 | Nyrhila | 419/47 X |
| 5,745,834 | 4/1998 | Bampton et al. | 419/37 |
| 5,784,681 | 7/1998 | Purnell et al. | 419/36 X |
| 5,819,154 | 10/1998 | Hu et al. | 419/11 |
| 5,872,322 | 2/1999 | Mocarski et al. | 419/47 X |

OTHER PUBLICATIONS

Carter, William T., Jr. et al., Direct Laser Sintering of Metals, Proc. Solid Freeform Fabrication Conference, Austin, Tx. Aug. 9–11, 1993.

Konig et al., "Rapid Metal Prototyping—New Approaches for Direct Manufacturing of Metallic Parts," Proc. 27$^{th}$ ISATA, Aachen, Germany Oct. 31.–Nov. 4, 1994 pp. 281–288.

"Little Wonder Uses SLS™ Process & Nylon to Create Functional Hedge–Trimmer Prototype," Spring/Summer 1994 vol. 4, No. 1.

U.S. Patent Application Serial No. 08/530,770 entitled "Free Form Fabrication of Metallic Components", filed Sep. 19, 1995.

German, Randall M., *Powder Metallurgy Science*, 2$^{nd}$ Edition, Metal Power Industries Federation, 1994, pp. 270–283.

*Primary Examiner*—Curtis Mayes
*Attorney, Agent, or Firm*—Koppel & Jacobs

[57] ABSTRACT

Direct Metal Fabrication of metal parts is accomplished with a continuous thermal process in which partial reduction of the "green form" part leaves a thin carbon film that maintains the part's structural integrity. The remaining carbon catalyzes a eutectic reducing element to diffuse throughout the part forming organo-metallic bonds that bind the homogenized metal alloy. Supersolidus liquid phase sintering (SLPS) densities the alloy to provide a final part of parent material quality. The DMF process can be used in magnetographic printing to imprint an image.

36 Claims, 9 Drawing Sheets

Ni
Ni₃B
Ni₂B
Ni₄B₃
NiB
Ni

DIRECT METAL FABRICATION (DMF) USING A CARBON PRECURSOR TO BIND THE "GREEN FORM" PART AND CATALYZE A EUTECTIC REDUCING ELEMENT IN A SUPERSOLIDUS LIQUID PHASE SINTERING (SLPS) PROCESS

BACKGROUND OF THE INVENTION

1. Field of the Invention

This invention relates to the direct fabrication of metal parts, and more specifically to a continuous thermal process in which a carbon precursor is used to bind the "green form" part and catalyze a eutectic reducing element in a supersolidus liquid phase sintering (SLPS) process that provides a final part of parent material quality.

2. Description of the Related Art

Historically, three-dimensional parts are machined by removing material from a block to form a final part directly or to form a mold for casting the final part. Direct machining of final parts is rarely cost efficient when done on a production scale. More typically, large scale production uses a casting process that is fairly time and cost efficient and produces cast quality final parts. However, the cost of retooling and machining a new part can be very high, both in dollar and man hour investment and in the delay in getting a new design into production. This can be a significant deterrent to updating and improving the design of the part.

In recent years several new manufacturing methods have been developed under the name Rapid Prototyping and Manufacturing (RPM) and have two things in common. First, the part is modeled as a 3D solid, which is "sliced" into very thin 2D layers and stored in a three-dimensional Computer Aided Design (CAD) file. Data is then transferred from the CAD file to the manufacturing equipment that builds the part layer-by-layer into the three dimensional structure. The concept of 'Art-to-Part', proceeding directly from a CAD file to a prototype part or mold, is extremely attractive to engineers and management alike. Second, the parts are manufactured by adding material where it is needed instead of removing material where it is not needed. This eliminates the need for retooling and machining, and permits complex structures to be made.

True RPM produces a "final" part in a single continuous process. The final part is ultimately a prototype shape or mold. None of the known RPM technologies produce metal parts that can be used in a structure or machine, the metal parts are too fragile and cannot withstand structural loads. If development requires metal parts, the polymer molds are typically used in a multi-step process to cast the metal parts.

At present there are a number of different RPM technologies that fall into one of three categories. Stereolithography (SLA) involves the chemical change of a material using light energy. Selective laser sintering (SLS) sinters a powder using a laser. Deposition techniques such as Solid Ground Curing (SGC), Laminated Object Manufaturing (LOM), Fused Deposition Modeling (FDM), and Ballistic Particle Manufacturing (BPM) use selective deposition of either particles or thin laminates.

In stereolithography a photosensitive liquid polymer is solidified layer by layer. The liquid polymer solidifies when it is exposed to a low power, ultra violet (UV) beam, for example, a UV laser. After each layer is solidified the part is lowered incrementally in the liquid and the next layer can be solidified. This method is restricted to the use of certain solidified polymers that allow solidification by a laser beam and, unfortunately, these polymers are often brittle. Stereolithography was the first commercial RPM-method (1987) on the market and is now the most frequently used.

William T. Carter, Jr. and Marshall G. Jones, "Direct Laser Sintering of Metals, Proc. Solid Freeform Fabrication Conference, Austin, Tex. Aug. 9–11, 1993 describes the basic selective laser sintering process for sintering parts from a binderless metal powder. The SLS process for plastic, metal, ceramic or polymer powders is described in detail in a series of U.S. Pat. Nos. 4,863,538, 4,938,816, 4,944,817, 5017,753 and 5,053,090 that are assigned to the Board of Regents of The University of Texas System. A roller spreads out the powder on a platform and the material is preheated to a temperature just below the melting temperature. An infra red laser beam raises the temperature where consolidation is desired and the powder fuses together. After each layer is solidified, the roller spreads out a new thin layer of powder over the part and the laser scans the next layer of the part in accordance with the 3D CAD file. When the solidification process is completed the green part is surrounded by powder that can be removed with a brush or by compressed air. This powder forms an important support to thin sections during the process. The green part is fairly fragile and thus only useable during the prototyping stages.

A number of modifications to the basic SLS process have been investigated to improve the part's density and strength so that it can withstand some degree of structural loading during prototype testing. None of the known methods provide final parts with parent material quality. Materials that are going to be used in commercial or military products must be qualified, which is a long and costly process. Thus, manufacturers have a strong incentive to use parent metal alloys that have already been qualified.

The RPM process can be augmented by back-infiltrating a secondary liquid metal such as copper via capillary pressure into a partially densified part to provide strength. The infiltration process interrupts the continuity of the RPM process, provides typical densities of only approximately 80% of the theoretical limit, and contaminates the metal alloy to such an extent that it can no longer be considered parent quality material. As a result, the part's mechanical properties such as strength and ductility differ significantly from the parent alloy. The elemental composition is different enough that the resulting alloy would require requalification.

Konig et al. "Rapid Metal Prototyping—New Approaches for Direct Manufacturing of Metallic Parts," Proc. $27^{th}$ ISATA, Aachen, Germany Oct 31-Nov. 4, 1994 pp. 281–288 describes an SLS process in which low and high melting point alloy powders are used without the addition of binders. The laser melts the low melting point powder causing it to wet the surface of the high melting point powder and bind the individual particles together. Konig used steel and nickel-bronze alloys. Haynes 230 metal alloy powders undoped and doped with 3% boron by weight to reduce its melting point temperature have also been used. The hot isostatic pressing (HIPing) process is also used to close the small amounts of isolated porosity. The high temperatures required to melt the doped alloy create severe temperature gradients that stress and distort the part during formation.

"Little Wonder Uses SLS™ Process & Nylon to Create Functional Hedge-Trimmer Prototype," Spring/Summer 1994 Volume 4, No. 1 describes DTM Corporation's variation on the SLS process in which a polymer powder is blended with a metal powder. The laser melts the polymer powder layer-by-layer in accordance with the 3D CAD file to form a solid but porous green form part. After the green form part is heated to burn out the polymer binder, it is subjected to partial sintering to impart residual strength to the remaining metal powder for subsequent densification via HIPing. This approach produces a very low metal density after burnout of the polymer binder, which results in a lack of control of part dimensions and shape during HIPing and very low strength in components utilizing liquid metal infiltration for final densification.

U.S. patent application Ser. No. 08/530,770 entitled "Free Form Fabrication of Metallic Components" filed Sep. 19, 1995, now U.S. Pat. No. 5,745,834, and assigned to Rockwell International, the Assignee of the present invention, uses a mixture of a parent metal alloy X such as Haynes 230, a metal alloy Y that is identical to alloy X except that it is doped with another alloying element such as boron to lower the melting point, and a polymer binder in the SLS process. The laser melts the polymer binder in accordance with the 3D CAD file to build up a green form part layer-by-layer.

Once the green form part is completed, the binder is eliminated in a vacuum furnace. It is necessary to support the green form part during elimination and the subsequent densification process because the removal of the polymer binder and the partial liquidation of the metal temporarily reduce the integral strength of the part. Support may be provided by a ceramic powder or a structure.

Densification is achieved via liquid phase sintering (LPS) by raising the furnace temperature to melt the doped alloy so that it encapsulates the undoped alloy powder. Finally, a HIPing treatment may be necessary to close any residual porosity and complete the homogenization of the part. This process still requires additional support for the green part and a HIPing treatment.

Known deposition techniques include Solid Ground Curing (SGC), Laminated Object Manufacturing (LOM), Fused Deposition Modeling (FDM), and Ballistic Particle Manufacturing (BPM). SGC is similar to sterolithography in that parts are built up with a photo reactive liquid polymer, but instead of scanning the surface with a laser beam this technique uses an electro static process to mask areas that are not supposed to be solidified. After each layer is solidified the remaining liquid polymer is removed and replaced by a layer of liquid wax that fills pores and cavities. A chilling plate hardens the wax and the surface is milled to the correct thickness. This process is repeated for the next layer. The advantage in this technique is that the wax constitutes a solid ground for each layer which means that there are practically no limitation on geometry.

In the LOM approach, a laser beam cuts the outline of the first layer of the part in a sheet of material and cross-hatches the excess material for later removal. A new layer of the sheet material is placed on top of the first and a laminating roller binds the layer together. The cutting motion of the laser is repeated for this layer. Once all layers have been laminated and cut, excess material is removed to expose the finished model.

FDM uses a spool of modeling filament resembling wire. The system feeds the filament through a heated head and nozzle. Just before deposition, the head heats the thermoplastic filament to a temperature slightly above its solidification state. As it deposits material, the material solidifies.

BPM has developed a technique for 3-D printing in an office environment. The process utilizes a piezoelectric jet head that deposits molten thermoplastic material wherever it is needed. The droplets will first flatten then solidify upon contact with the surface. This process is primarily used for modeling.

In a relatively new development, Randall M. Germann, *Powder Metallurgy Science*, $2^{nd}$ edition, Metal Powder Industries Federation, 1994, pp. 270–283 describes a recently discovered method of densifying an already homogenized but porous metal alloy known as Supersolidus Liquid Phase Sintering (SLPS). As the homogenized alloy is raised above its solidus temperature, a liquid film forms along the grain boundaries and particle necks between grains. This promotes grain boundary sliding of the polycrystalline particles. The disintegration of particle boundaries allows rapid densification due to surface tension and capillary pressure. As the liquid reprecipitates the grains themselves deform to assist in pore removal and final densification. SLPS is superior to conventional LPS in that a single alloy is formed rather than one alloy being encapsulated by another. LPS will homogenize if left long enough at a high enough temperature.

SUMMARY OF THE INVENTION

The present invention provides a method of direct metal fabrication (DMF) of complex shaped metal parts having parent material quality in a single continuous thermal cycle without the need to support the green form part or infiltrate a secondary metal via capillary pressure into a partially densified part to achieve full density.

This is accomplished by using a carbon precursor to wet a parent metal alloy that is mixed with a eutectic reducing element and bind the metal particles into a "green form" part. The carbon precursor is partially reduced leaving a thin carbon film whose C=C bonds maintains the part's shape and acts as a catalyst causing the eutectic reducing element to become diffusely mobile. The reducing element diffuses along the particles' grain boundaries and interacts with the carbon film at the interface between particles to form organo-metallic bonds that are much stronger than the film's C=C bonds. The reducing element is preferably diffused until it reaches equilibrium at which point the metal alloy powder is fully homogenized. Supersolidus liquid phase sintering (SLPS) forms a liquid film along the particles' grain boundaries so that the grains slide relative to each other and densify in response to surface tension and capillary pressure to form a final part that is held together by the organo-metallic bonds.

The carbon assisted SLPS process avoids liquid phase injection thereby producing a final part of parent material quality in a single thermal cycle that can be used in both prototype and commercial applications. This DMF processes reduces both time-to-market and manufacturing costs and can be used in conjunction with applications such as SLS, magnetographic printing, and free-form casting that are used to make the "green form" part.

These and other features and advantages of the invention will be apparent to those skilled in the art from the following detailed description of preferred embodiments, taken together with the accompanying figures, in which:

DETAILED DESCRIPTION OF THE INVENTION

The present invention provides a continuous thermal process in which partial reduction of the "green form" part leaves a thin carbon film that maintains the part's structural integrity and catalyzes a eutectic reducing element such as boron to diffuse throughout the part forming organo-metallic bonds that bind the homogenized metal alloy. Supersolidus liquid phase sintering (SLPS) densities the alloy to provide a final part of parent material quality. The ability to directly form a final part of parent material quality in a single continuous thermal cycle will greatly reduce the time-to-market and cost. DMF can be used to form molds for casting or to directly form prototype or commercial quality parts.

Figure 1:
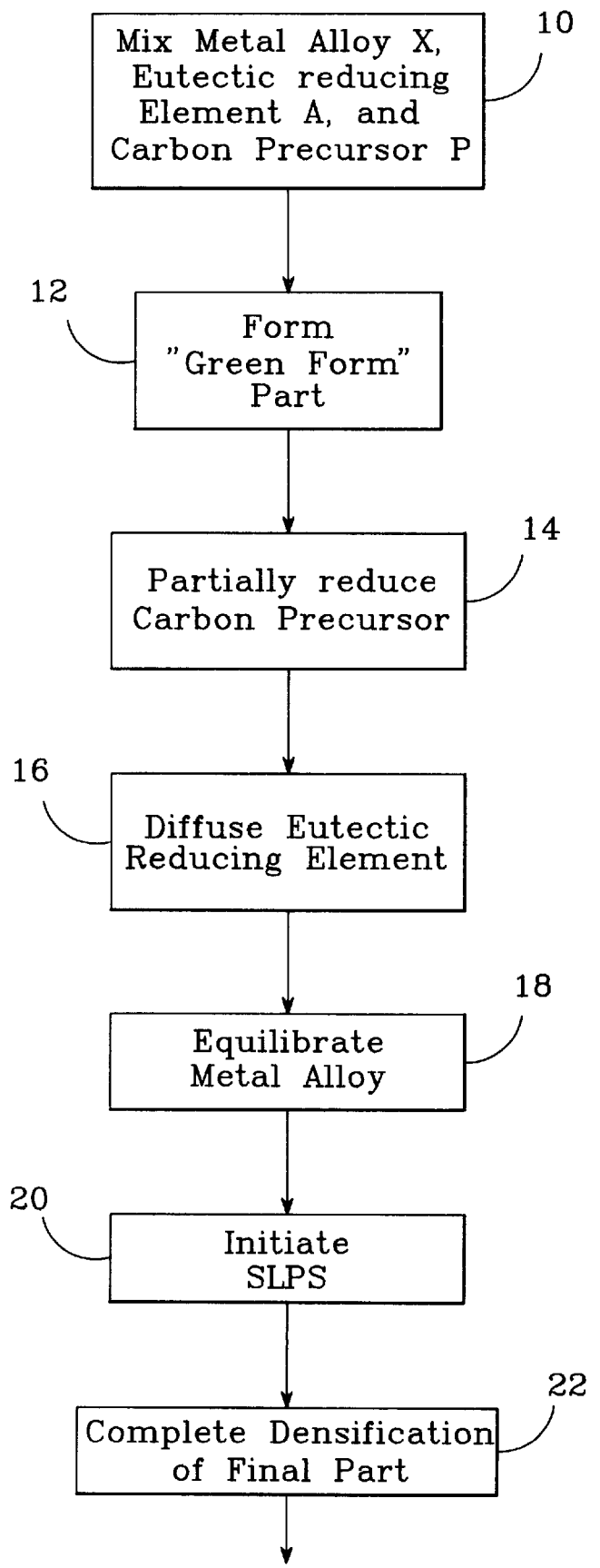
FIG. 1 is a flowchart illustrating the DMF process of the present invention.

The DMF process shown in FIG. 1 and illustrated at a microstructure level in FIGS. 2a through 2f starts with a carefully selected mixture (step 10) of a parent metal alloy X 30, a eutectic reducing element A 32, and a carbon precursor 34. The parent metal alloy X 30 is suitably the nickel based alloy Haynes-230 whose nominal composition is as follows:

| Element | Weight Percent |
|---------|----------------|
| Ni | Balance |
| Cr | 22 |
| W | 14 |
| Mo | 2 |
| Fe | 3 |
| Co | 5 |
| Mn | 0.5 |
| Si | 0.4 |
| Al | 0.3 |
| C | 0.1 |
| La | 0.02 |
| B | 0.005 |

The nickel based Haynes-230 powder was selected for its superior ductile properties but other parent metals such as iron, cobalt, copper, tungsten, molybdenum, rhenium, titanium, and aluminum, for example, may also be used.

The eutectic reducing element A 32 by definition reduces the melting temperature of the parent alloy. The reducing element must also be very small and highly reactive with carbon so that it may become diffusely mobile along the grain boundaries 36 between the individual grains 38 in a Haynes-230 particle 30. Boron is an intermetallic element that reduces the melting point temperature of this alloy, is very small and thus highly mobile, and reacts with carbon to form very strong organo-metallic bonds, e.g. $B_4C$ or $B_{12}C_3$, that have a melting temperature far above any temperature in the DMF process. Scandium is yet another example. Other metallic elements such as manganese, yttrium, niobium, silicon and cobalt are eutectic but may not have the required diffusion properties.

The carbon precursor 34 must be capable of wetting and bonding the parent metal alloy 30 in its green form and, when heated, of undergoing a reduction that eliminates the molecules of gaseous elements (hydrogen, nitrogen and oxygen) and leaves a thin carbon film that maintains the structural integrity of the green form part. Typical carbon precursors are organic polymers (P) such as powders or resins or catalytic chemical vapors. Although many organic polymers can be used to produce the carbon film for DMF, only three have real commercial potential as a fine powder: polyester (rayon), polyacrylonitrile (acrylic), and polyamide (nylon). In the preferred embodiment, the carbon is introduced via a fine mesh Nylon-12 high molecular weight polymer powder.

The mixture is primarily composed of the parent metal alloy X 30 so that the final densified part retains parent material quality. The concentration of eutectic reducing element 32 must be great enough to a) completely diffuse through the grain boundaries of the parent metal alloy, b) react with the carbon to form a sufficient number of organo-metallic bonds, and c) assist SLPS. The reducing element is introduced in such a manner that it must diffuse to reach its lowest energy or equilibrium state. Testing has revealed that with current techniques free boron does not diffuse completely, however boron pre-alloyed in the parent material has been found to diffuse to equilibrium. If the level of the reducing element is too high, the final part will be brittle. The carbon levels in the precursors 34 must be high enough to a) survive the reduction that removes the gaseous components, b) form the thin carbon film and c) react with the eutectic reducing element. If the carbon levels are too high too much of the reducing element will be absorbed thereby inhibiting the SLPS process.

The precise mixture by weight and/or volume will depend on the parent metal composition and its phase diagram, the particular application, the process used to form the green form part, the desired properties of the final part, whether the precursor is reduced in an enhanced environment or not, how the reducing element is introduced, etc. For example, the parent alloy 30 is suitably Haynes-230 and constitutes approximately 75–85% of the total blend by volume, the eutectic reducing element 32 is introduced via Borided Haynes-230 39 (Alloy Y) which constitutes approximately 5–15% by volume with 0.15–0.5% boron by weight and the carbon is introduced via a fine mesh Nylon-12 high molecular weight polymer powder 34 that provides the remaining 5–15% by volume. In a particular application in which the green form part was formed using SLS and was reduced in an unassisted environment, a mixture of 5% Borided Haynes-230 with 0.15% boron by weight and 10% by volume Nylon-12 binder with the remainder being Haynes-230 was used.

Figure 2A:
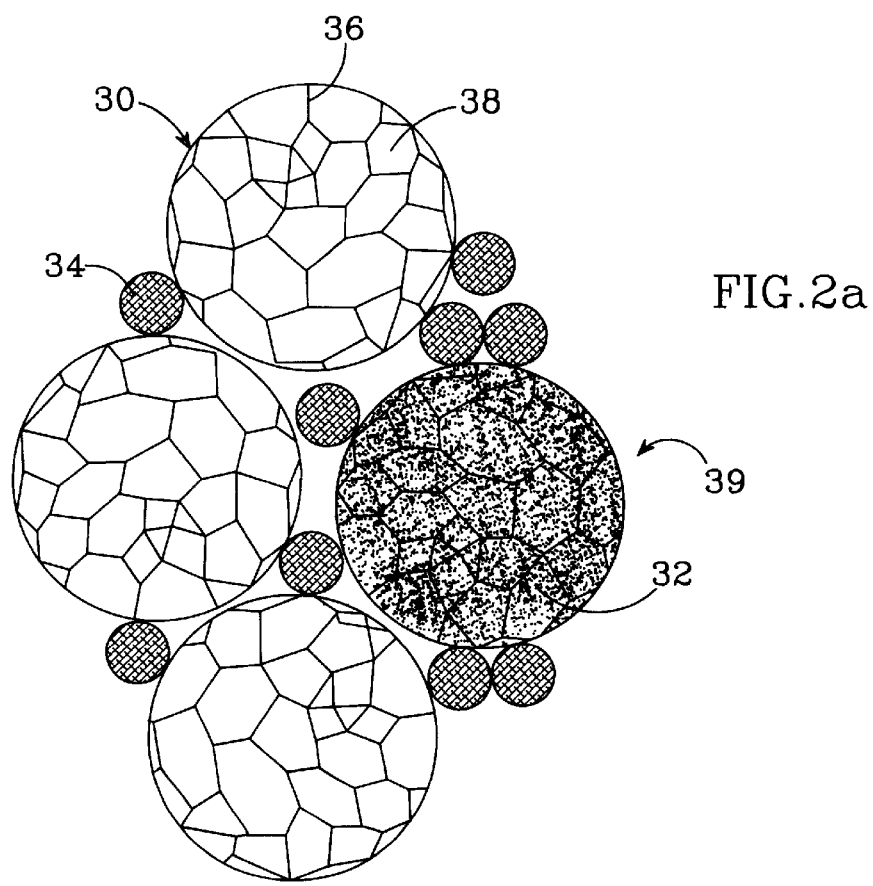
FIGS. 2a through 2G are pictorial representations of the metal alloy particles under going the carbon assisted SLPS of the present invention corresponding to the respective steps illustrated in FIG. 1.
Figure 2B:
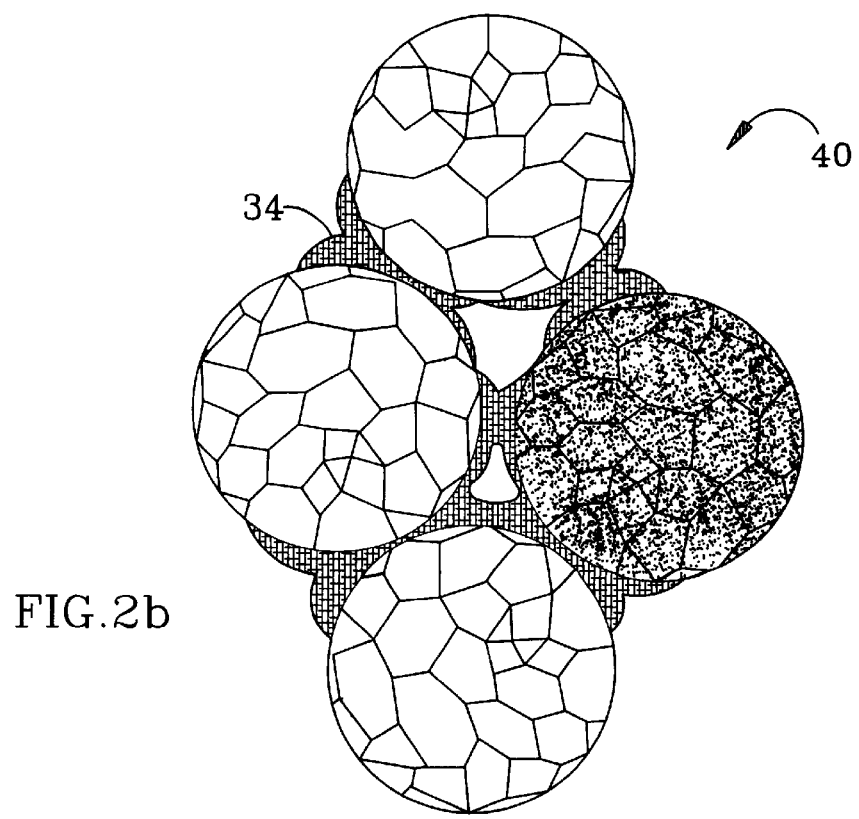
Figure 2C:
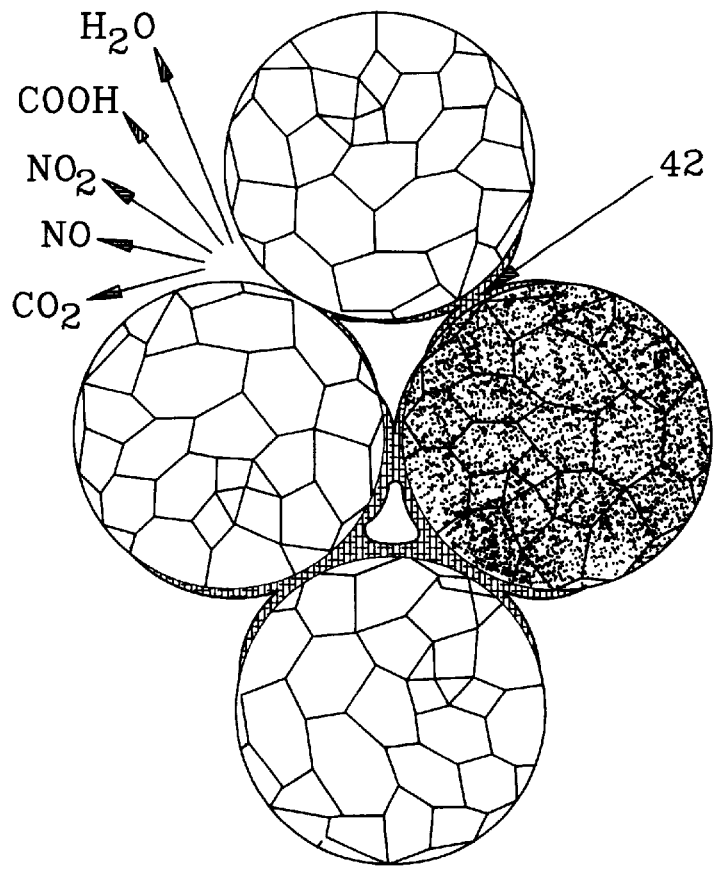

This mixture of blended metal and polymer powder is then loaded into a particular DMF application such as SLS, magnetographic printing, free form casting, etc. to form (step 12) the green form part 40, a portion of which is shown in FIG. 2b at a microstructure level. In the SLS and magnetographic printing applications, the nylon portion 34 of the blended powders is selectively melted to wet and bind a three-dimensional part. In a free form casting application, the carbon precursor is a resin or epoxy that can be used to directly wet and bind the powder. The green form parts, which typically have a relative density of approximately 55%, are easily handled without any additional support. Tests have shown that typical green form parts exhibit approximately 4.3, 2.9 and 23.3 times the strength of green form parts constructed using borided Haynes-230 with no carbon precursor, Haynes-230 with the carbon precursor but no eutectic element, and 90% Haynes-230 and 10% borided Haynes-230, respectively.

Figure 3:
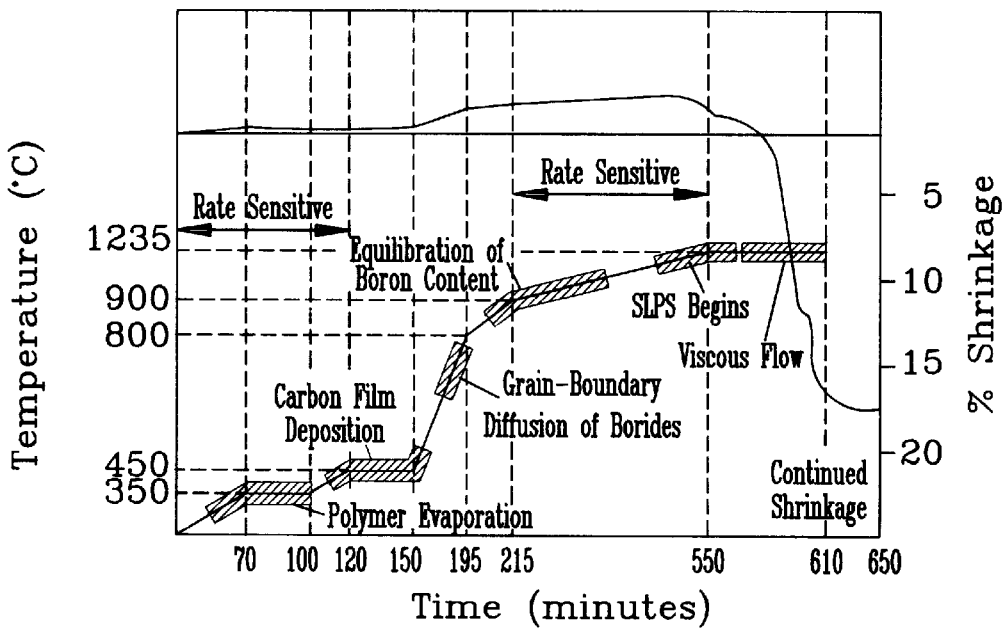
FIG. 3 is a plot of a typical thermal cycle from the green form part to the final densified part.

The green form part is placed in a computer controlled vacuum furnace where the temperature and atmosphere are precisely adjusted to reduce and carbonize the melted nylon binder and transition through SLPS thermal profiles of the metal powder to produce the final part with parent material quality. As described in detail below, the green form part is subjected to a single continuous thermal cycle 41 as shown in FIG. 3 in which the polymer is reduced to deposit a carbon film (200–500° C.), the boron is diffused to equilibrium, (500–1200° C.), SLPS is initiated (1200–1300° C.) and the final part is cooled. The specific thermal cycle will change with part geometry, mixture, application, etc.

Once the green form is placed in the furnace, the metal particles begin to heat (200–500° C.) and the carbon precursor 34 undergoes partial reduction (step 14). Volitization occurs in the early stages of heating causing the precursor breaks down as the hydrogen, nitrogen, oxygen and some of the carbon is off-gassed from the part. The remainder of the volatile carbon reacts with the metal oxides on the surface of the particles to form a thin carbon film 42 whose cross-linked C=C bonds maintain the shape of the formed part. The rate of reduction must be controlled such that the pressure due to outgassing is always less than the bond strength of the particles to avoid exploding the green form part. Reduction can be accelerated by enhancing the environment with oxygen and/or hydrogen. The enhanced reduction will eliminate a larger percentage of the carbon and, thus, the carbon levels in the precursor must be elevated.

Figure 2D:
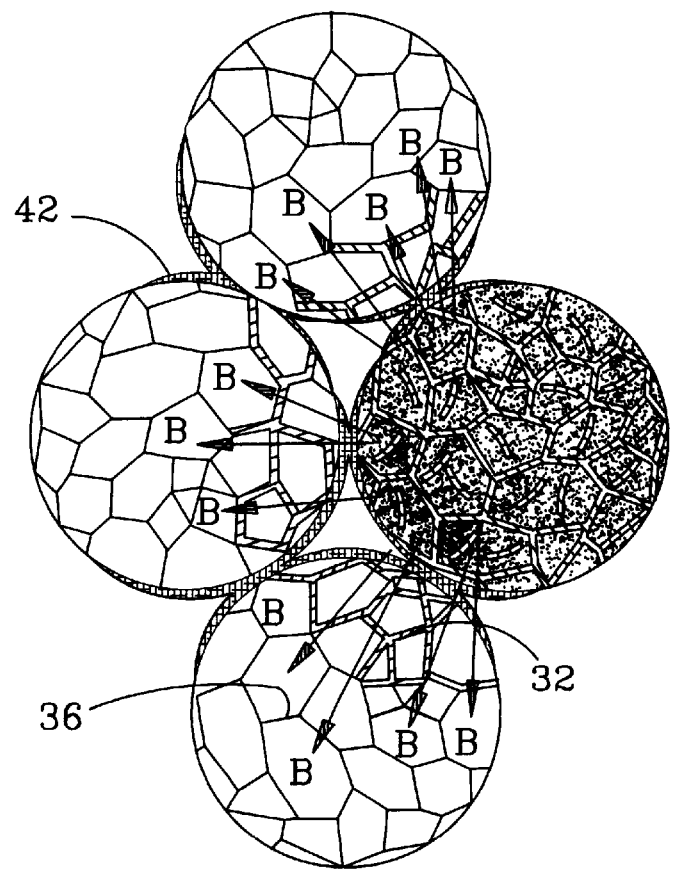
Figure 2E:
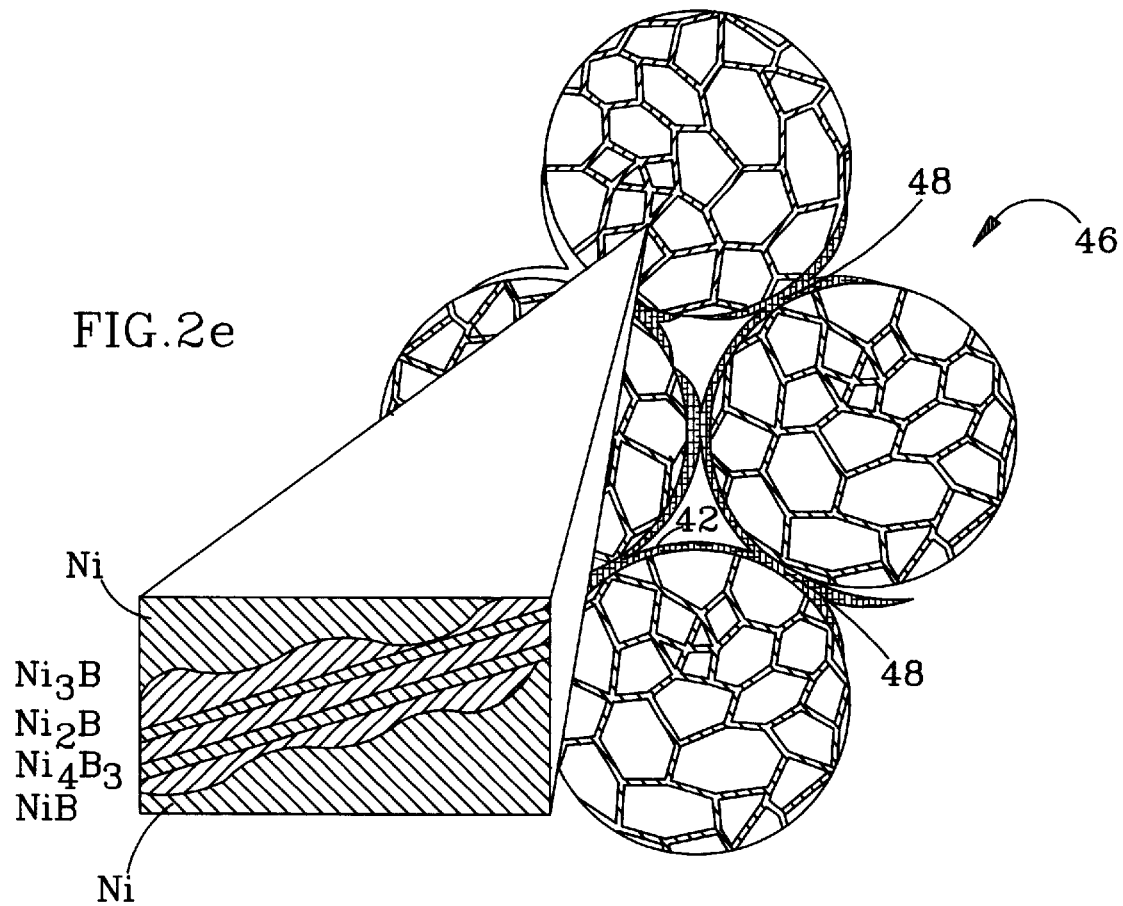

The carbon also acts as a catalyst causing the boron, i.e. the eutectic reducing element 32 in the borided Haynes-230 as shown in FIG. 2d to become diffusely mobile as the furnace temperature is increased (500–1200° C.) and diffuse along the particles' grain boundaries 36 (step 16). The carbon reacts with nickel oxides on the surface of the particles allowing the surface to be cleaned. This enhances the driving force of capillary pressure to equilibrate (step 18) the boron content throughout the microstructure as shown in FIG. 2e. The result is a fully homogenous metal alloy powder 46 that is held together by a unique bond located at interparticle necks.

It is critical to the DMF process that the boron, catalyzed by the outgassing of the polymer, diffuses throughout the powder to equilibrium at a relatively low temperature forming very strong organo-metallic bonds. Without the carbon catalyst, the borided Haynes-230 would eventually melt and encapsulate the Haynes-230 in a conventional LPS process. The uncatalyzed boron would partially diffuse into the Haynes-230 forming only relatively weak bonds. Furthermore, the much higher melting point temperature, 300 to 400° C., stresses the part potentially causing it to crack or break.

As the boron diffuses along the particles' grain boundaries towards its equilibrium state, it reacts with any remaining carbon to form a carbide via a solid state chemical, i.e. ($B_4C$ or chains of $B_{12}C_3$), bond 48. The formation of these strong organo-metallic bonds 48 at the interstices of the metal particles explains the increased strength over specimens produced without the carbon precursor. At this point, the bond strength provided by the carbon film becomes negligible in the presence of the organo-metallic bonds 48.

Figure 2F:
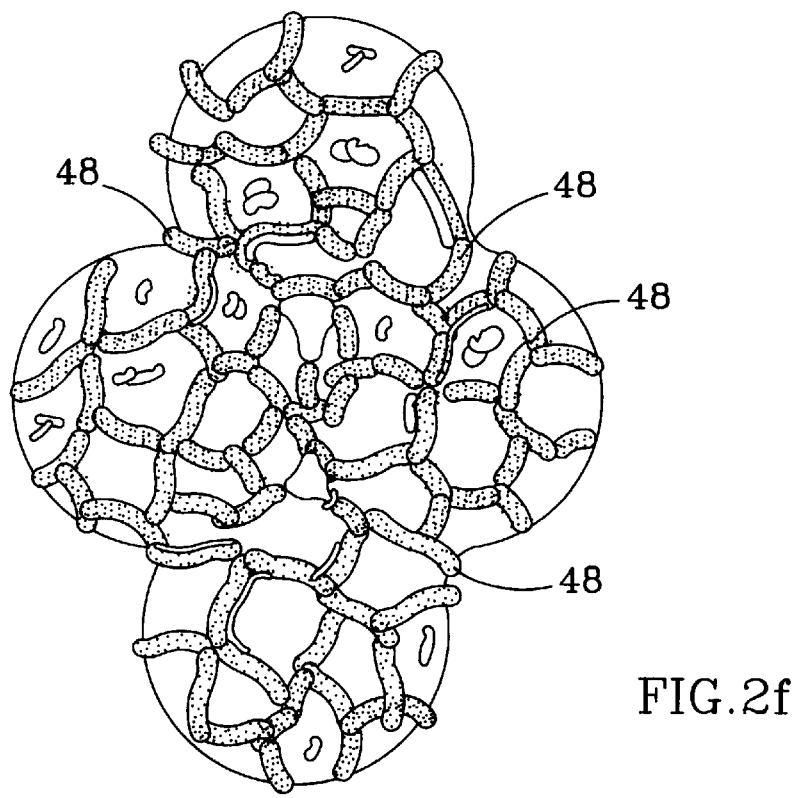
Figure 2G:
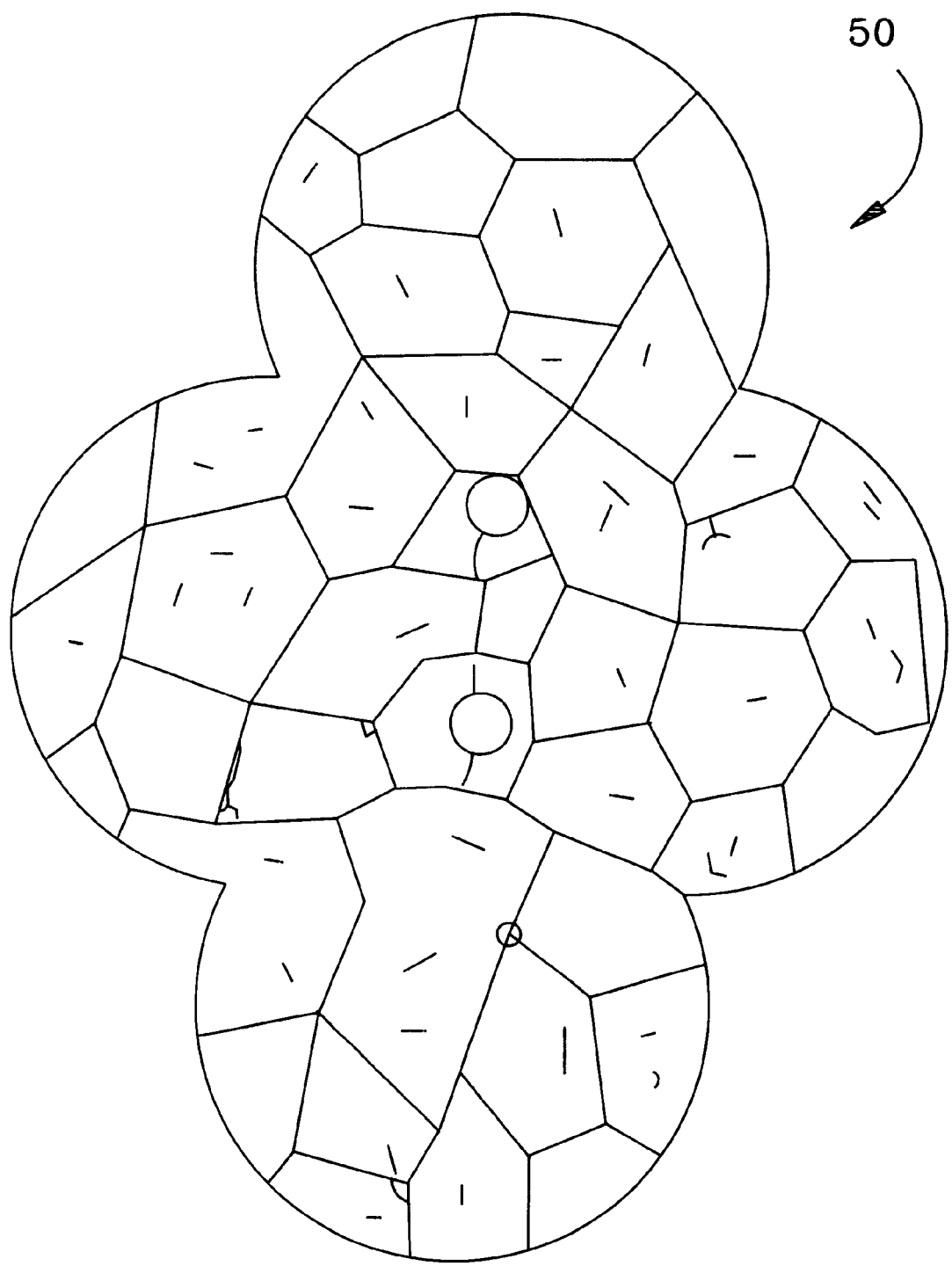

Once the necessary thermal conditions are achieved and the boron content has reached equilibrium, Supersolidus Liquid Phase Sintering will initiate (step 20) as shown in FIG. 2f. As the alloy is raised above the solidus temperature (1200–1300° C.), a liquid film forms along the grain boundaries 36 and particle necks due to the elevated levels of the eutectic reducing element. The liquid phase promotes grain boundary sliding of the polycrystalline particles. The disintegration of particles allows rapid densification due to surface tension forces and capillary pressure. As the liquid reprecipitates the grain boundaries deform to assist in pore removal and final densification. This process has no transport mechanism other than the viscous flow involved. Densification entails a localized breakdown of particle structure, which ultimately enables full densification to be achieved as pores are eliminated through grain boundary diffusion and then during cool-down as shown in FIG. 2g. The fully homogenous metal alloy powder 46 has now densified into a final part 50 that is permeated with the organo-metallic bonds 48 while retaining the shape of the green form part. Assuming full densification, the part in this particular process will shrink approximately 17.2% in all directions from green form to final. In general, the amount of shrinkage depends on the initial relative density.

Figure 4:
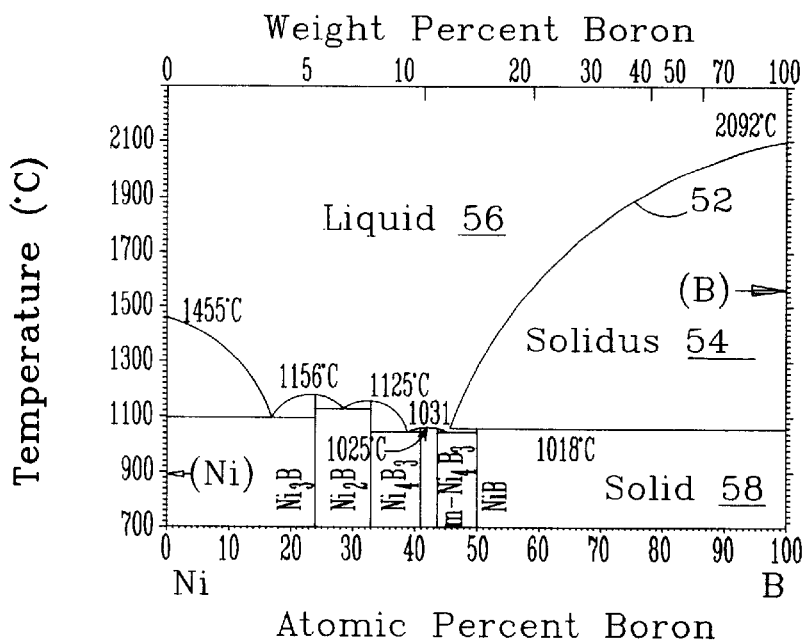
FIG. 4 is a binary phase diagram for the metal alloy showing multiple supersolidus regions.

FIG. 4 is a phase diagram 52 for a Ni—B composition. The boron concentration is selected so that the transition between the supersolidus and liquid regions 54 and 56, respectively, follows a steep gradient that provides the driving force required for complete diffusion. Below 1018° C., the nickel and boron exists in a solid state as $Ni_4B_3$, NiB, $Ni_2B$, $Ni_3B$, in region 58. When the temperature is raised above 1050° C., NiB is liquid and the diffusion couple is now a combination of solid and liquid phase, or supersolidus. This liquid phase rapidly wets all the nickel particles, further enhancing Ni—B diffusion. This also causes strong Ni—Ni necks between particles. Eventually the boron is equilibrated as solid $Ni_3B$ below 1095° C. As the temperature is increased above 1095° C. the remaining intermetallics melt and cause rapid Supersolidus Liquid Phase Sintering, since they easily coat the grain boundaries.

In general, as the temperature is increased, the liquid phase volume fraction and, hence, the size of the necks between the particles increases. The individual grains rotate and slide into neck regions to reduce surface tension caused by excessive curvature. When the liquid film reaches a threshold value, depending on particle size, viscous flow begins to be favored and particles begin to slide. This allows rearrangement of the now semi-solid particles. However the loss of viscosity associated with the increase in liquid phase is cancelled by the reduction in capillary pressure. This corresponds to the velocity of the particles reaching zero as the part achieves full density.

Figure 5:
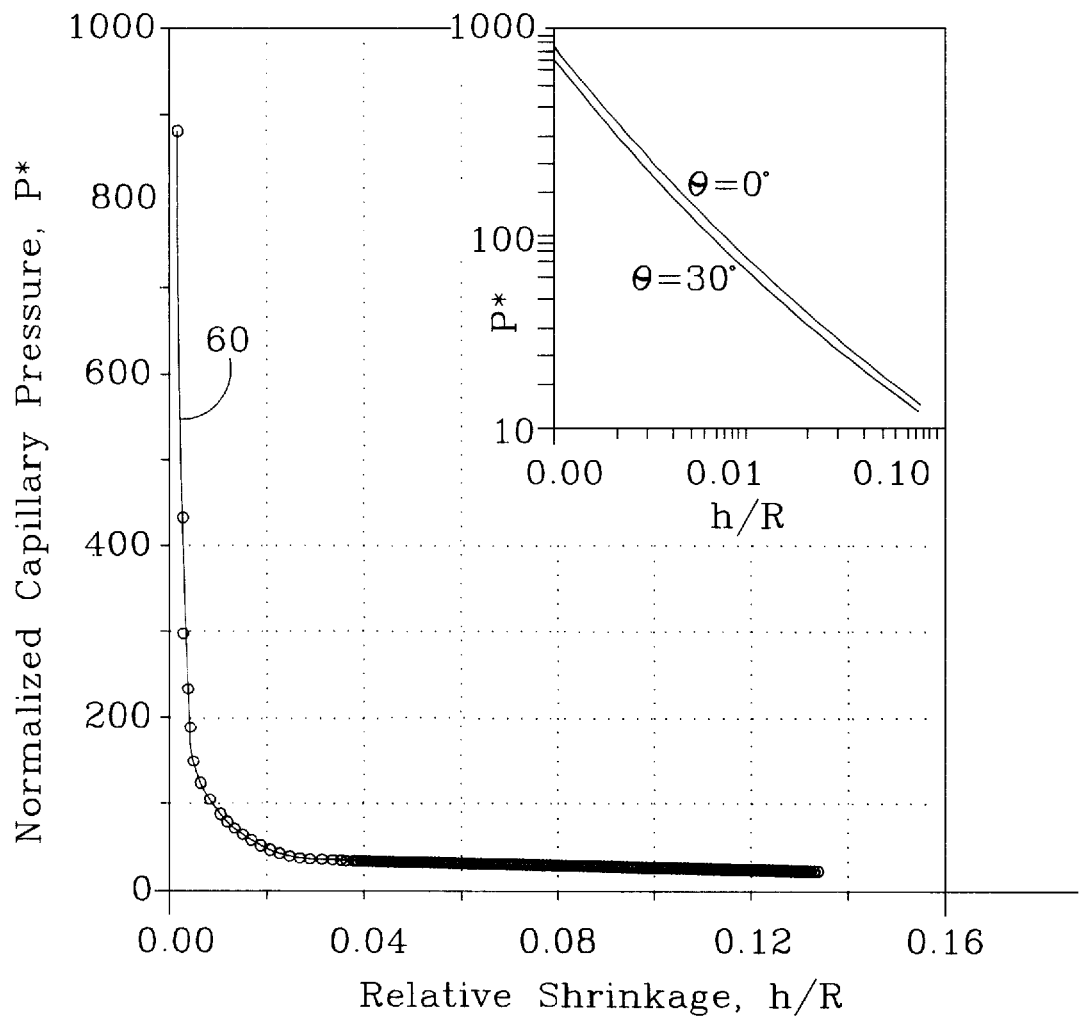
FIG. 5 is a plot of the normalized capillary pressure vs. Relative shrinkage for SLPS.

As illustrated in a plot 60 of normalized capillary pressure vs. relative shrinkage in FIG. 5, as the necks evolve from an infinitesimal point to a finite neck area the capillary force between the particles necks' increases but the pressure is reduced. This reduction in pressure in the early stages of SLPS gives rise to a rapid rate of densification. As the capillary force tapers off, so does the rate of densification.

Figure 6:
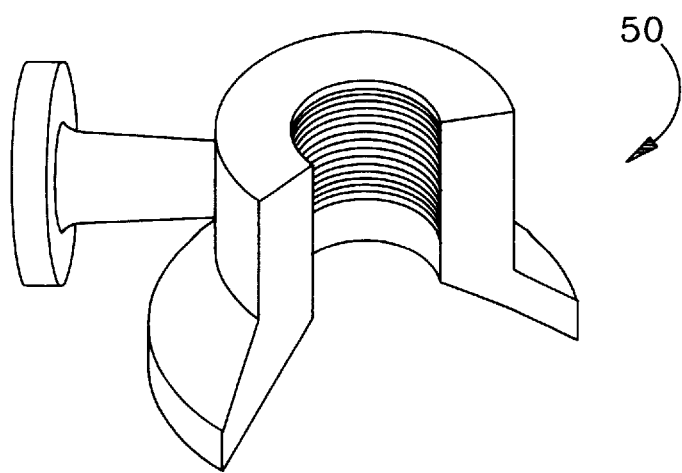
FIG. 6 is a partially cut-away view of a representative final part formed in accordance with the present invention.

FIG. 6 shows a representative final part 50 fabricated with the DMF process in a single thermal cycle from "green form" to "final" part. The concentrations of boron and carbon are negligible so that the final part exhibits the material quality of the parent alloy Haynes-230. The final parts exhibit tensile and yield strengths superior to cast parts and comparable to hot rolled annealed parts. As a result, the final parts can be used to form working commercial or prototype parts in addition to casting molds.

Figure 7:
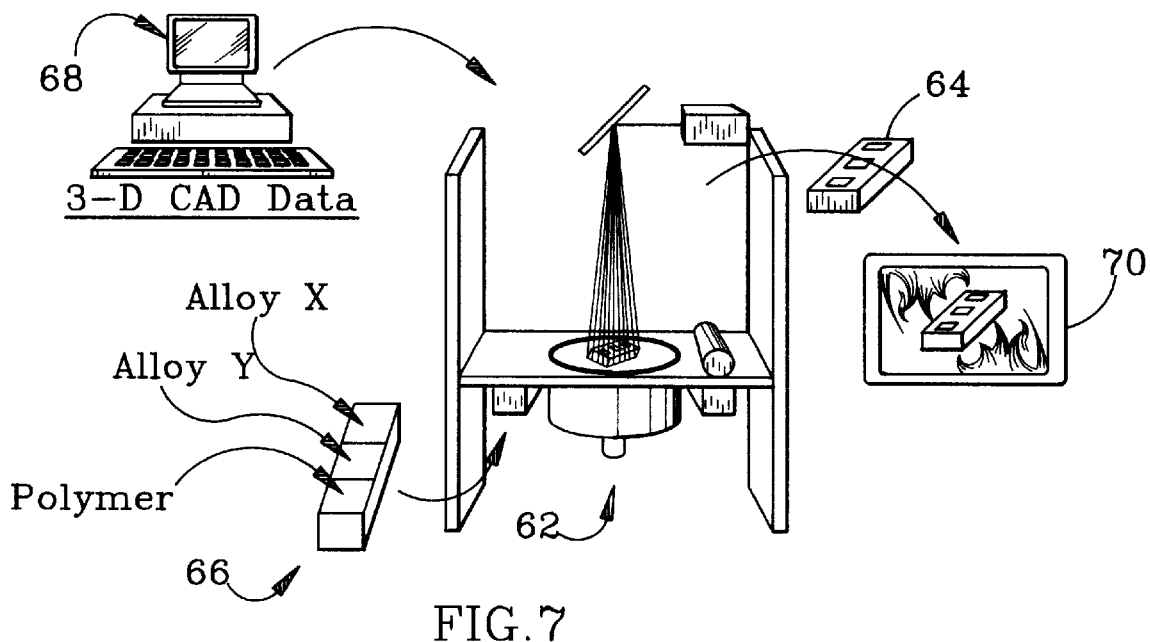
FIG. 7 is a schematic illustration of the SLS-based DMF process.
Figure 8:
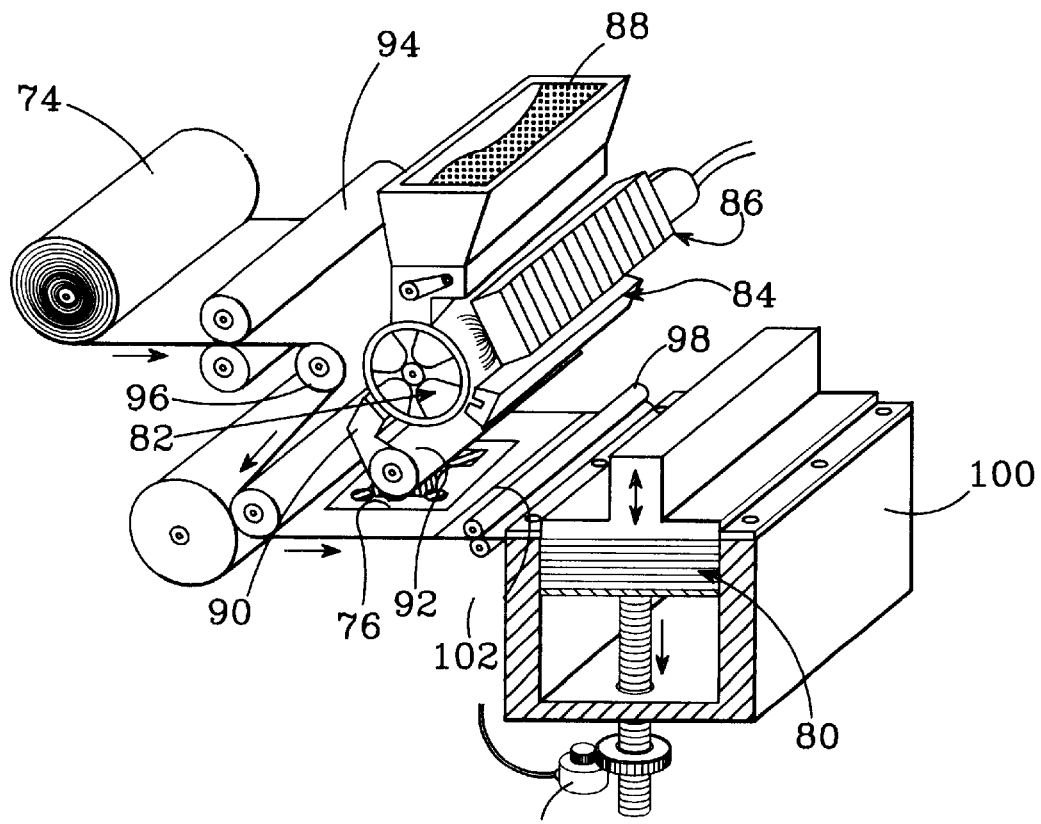
FIG. 8 is a schematic illustration of the metallographic printing-based DMF process.
Figure 9:
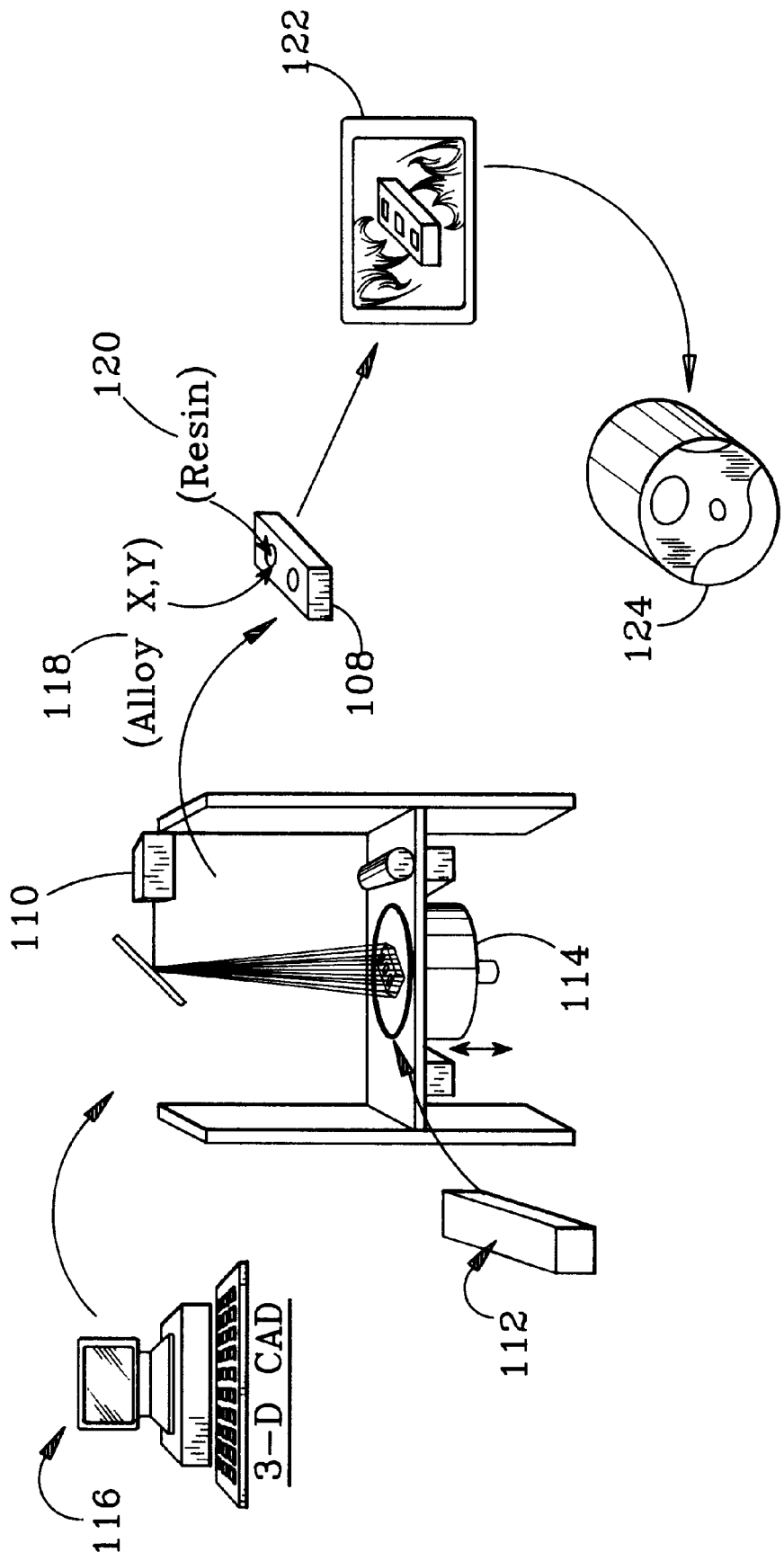
FIG. 9 is a schematic illustration of the free form casting based DMF process.

The described DMF process of a) specifying an appropriate mixture of the parent metal alloy, eutectic reducing element, and carbon precursor and b) thermal cycling the green form part to form the final part can be incorporated into a number of different fabrication applications. Nearly every known RPM method such as SLS, magnetographic printing, free-form casting, FDM, SGC and LOM can be implemented to selectively introduce the carbon precursor to the metal powder to form the green form part. FIGS. 7, 8 and 9 are schematic illustrations of SLS, magnetographic printing, and free-form casting based DMF processes, respectively.

The SLS-based DMF process illustrated in FIG. 7 uses a modified SLS machine 62 to fabricate a green form part 64. The SLS machine parts were modified to account for the increased structural demands placed on weight bearing members, primarily due to the increase in material weight, up from polycarbonates to metal powders. Counter weights may be installed for the powder pistons, but the SLS machine itself is virtually unchanged. The part bed is heated to provided a uniform temperature throughout the powder to prevent the initial part sections from sliding in the surrounding powder as the new layers of powder are rolled on. This minimizes the stress and strain on the green form part as it is fabricated.

The machine is loaded with the desired metal powder mixture 66. This mixture contained specific proportions of Haynes 230, borided Haynes 230, boron, and a Nylon 12 polymer binder. Using standard SLS methods, individual powder layers are rolled on and the laser is used to selectively melt the binder in accordance with 3D CAD data supplied by a computer 68 and wet the surface of the metal particles in each section of the part. This allows the metal mix to be held together in the green form part 64. The average particle size of the binder is suitably 5 mm. This allows the binder to take up only a small percentage of the total volume, 5–15%, of the green part, and only a few percent of the final part volume. The small particle size also increases the flowability of the powder by filling interstitial voids. The density of these parts was approximately 55% of theoretical, slightly less than random close packing.

Once out of the SLS machine, the excess powder is brushed off and the parts are pyrolized in a vacuum furnace 70, at an atmosphere of approximately $10^{-5}$ torr. The specimens are either in ceramic boats for the heating cycle, or if they are complex parts they were packed in boron nitride powder inside a ceramic crucible. The crucible and boron nitride powder create an evenly heated environment that also supports the part to prevent it from slumping. The vacuum assists in the off-gassing of the binder as well as preventing the metal from oxidizing excessively during its time at elevated temperatures. The heating cycle involves a slow ramp rate (boron diffusion) up to an isothermal soak temperature (SLPS) followed by cooling in the furnace.

As shown in FIG. 8, a magnetographic printing-based DMF process uses a high speed direct metal forming printer 72 (similar to the type developed by Bull Industries to print magnetic toner powder containing graphite, carbon and polymer onto paper) to imprint a substrate carrier 74 with an image 76 formed from the desired metal powder mixture 78, laminates several layers of the imprinted carrier to form a green form part 80, and subjects it to the thermal cycle shown in FIG. 3 to form the final part. Manetography only works with magnetic alloy powder mixtures. At elevated temperatures, the Haynes-230 based mixture is sufficiently magnetic to be used as the magnetic component of the toner. High Ni or Fe based alloys would allow the process to be implemented at lower temperatures, possibly below the curie. The substrate carrier may itself be a polymer that contributes carbon to form the carbon film and catalyze the reducing element. The principles of magnetic printing are quite old. As early as 1839, W. Jones proposed to make "impressions by means of natural magnetism" and claimed results as "fully equal to lithography."

At the heart of the process is a magnetically sensitive printing drum 82 that can be "selectively" magnetized and de-magnetized allowing the transfer of image 76 to the drum by discrete points of magnetic fields. The drum rotates at a constant rate, suitably 60 revolutions per minute (rpm). The outer surface of the drum is made of a magnetically hard layer, electrodeposited on a magnetically soft substrate. The coercivity is typically in the range of 500 oersted. Because of its mechanical strength, the media life is expected to reach tens of millions of prints. During each revolution, the drum is magnetically reset by energizing a conventional erasing bar 84.

A parallel, high speed, static writing head array 86 transfers the latent image to the spinning drum 82 by discretely controlled magnetic fields. The static recording station consists of a parallel array of magnetic recording heads that extend transversely across the drum. The printing heads feature perpendicular recording, closed-loop flux operation providing higher magnetic efficiency and thus allowing the use of low drive current in the range of 100–150 milliamps. In addition, this arrangement of magnetic printing heads also provides the ability to be laid out at high transverse packing densities, which wouldn't otherwise be possible with conventional head structures.

Printing densities of 240 to 300 poles to the inch are presently used. These densities are capable of providing a printing resolution of 300 dpi for direct metal fabrication and with future developments will probably exceed 600 dpi. At this density, thousands of heads are electronically controlled. Actually, the heads are constructed in blocks, or modules with internal multiplexing on seven select lines. Therefore, only 48 bits are necessary to drive the blocks. Moreover, because the head operations are very fast, a few microseconds, the different blocks used to constitute the recording station can be further timeshared: the 48-bit electronic bus is sufficient to drive several blocks. This static parallel head is the magnetographic counterpart of the serial electro-optical system of electro photography, which usually consists of a laser acousto-optical modular, lenses, and precision polygonal mirror.

When activated, each head records a tiny magnetic dot with a diameter of about $100\mu$. It's the combination of such dots, each retaining a permanent magnetization, that constitutes the latent magnetic image. The external magnetic field developed by the image, in the immediate vicinity of the drum of the drum surface, is rather low and typically on the order of 100 oersted to 200 oersted. The field, however exhibits an extremely high field gradient which is of great importance when establishing high resolution metal powder pick-up to produce a layer-wise constructed part print. The field gradient determines the precision of the edge definition and the final tolerances of the green form. These gradient will actually enable the magnetic printing method to surpass the selective laser sintering capability providing greater control and part registration from layer-to-layer.

Layerwise metallic image development is achieved by passing the latent magnetic drum image past a powder feed 88, where the metal powder plays the role of a toner in a standard printing process. A static wedge 90 causes the metallic particles to accumulate against drum 82, building sufficient pressure so that shearing forces prevent particles from sticking in the non-image areas. A magnetic scavenging device 92, assisted by a vacuum knife, provides the antagonistic force to get adequate control of the amount of metallic powder deposited. The image is then ready to be transferred to polymer substrate carrier film 74.

The polymer substrate is drawn through a pair of rollers 94 with the top roller heating the substrate so that it becomes sticky. Although a reasonable portion of the transfer force is provided by mechanical pressure (60%) providing by passing the thermally activated substrate over a roller 96 in close proximity to the drum, the remaining transfer force is provided by the thermally activated adhesive polymer substrate which bonds to the metal powder image and pulls it from the printing drum. The thermal activated polymer substrate is an essential element in the HS-DMF process in that it enables the ability to tack the metal powder then be de-activated by cold rolls 98 so that the image is easily handled by the remaining web function.

After image 76 has been transferred, the drum surface is cleaned of excess metal powder that escaped the transfer. Because of the mechanical strength of the drum media, a very simple method-such as using a simple doctor blade scraper-can be used for efficient cleaning. The captured powder, together with the scavenged powder, can all be reclaimed and reused. Analysis has proven that the magnetic printing process doesn't suffer as a result of particle size classification phenomena. Therefore, recycling the toner doesn't affect performance and allows overall transfer efficiency to be as high as 98%.

Once the transfer of the metal image 76 to the substrate 74 has been completed, the substrate is advanced to a machine 100 that shears the substrate along its preprinted registration marks 102, presses it under heat to laminate it to the previous imprinted sheet, and indexes a stepper motor 104 to lower the partially formed green form part 80 to receive the next sheet. Simultaneously, drum 82 is re-imaged by the next set of layer data from the CAD file. This process can presently be performed at a rate of approximately 100 sheets per minute. At this rate, it takes only ten minutes to build 2 inches in the z-axis of a part. This compares to approximately 2 inches in 20 hours achieved by the SLS method!

Magnetographic printing based DMF will greatly reduce the time-to-market and production costs. The DMF process can produce parts without molds, dies, or scrap material, e.g. five pounds of material will produce a five pound part. . Production costs will be limited to metal powder raw materials and electric power requirements for a vacuum furnace to operate at 1300° C. for 12 to 30 hours. DMF offers the ability to produce part designs which would otherwise be impossible by any other machining or fabrication method. DMF delivers the ability to the engineer and designer to produce a hollow metal part, reverse counter relief, complex internal structures, and highly complex compound curvature. The layering build-up method introduced a unique ability to implement composite combinations of powders to selectively construct mechanical behavior. Ductility, toughness and hardness are routinely controlled by trace elements, particulates, and fibers which are mixed with the standard metallic powders. Likewise, the strength is generally increased as a result of the DMF process circumventing complete liquidus melting and recrystalization of the base metal.

FIG. 9 illustrates the free-form casting based DMF process in which an RPM process 106 is used to form a master mold 108. For example, a stereolitographic process uses a low powered ultra violet laser beam 110 to solidify a photosensitive liquid polymer 112. After each layer is solidified the part is lowered incrementally in the liquid bath 114 and the data for the next layer is read from the CAD file 116 to control the laser. The metal powder mixture 118, suitably 75–85% Haynes-230 and 5–15% borided Haynes-230, is mixed with a polymer resin or epoxy 120 that wets and binds the metal particles together to provide a green form part in the mold 108 without sintering. The mold 108 is then placed in a furnace 122 and subjected to a thermal cycle of the type depicted in FIG. 3. The reduction environment is carefully controlled so that only a portion of the carbon is reduced leaving enough to catalyze the eutectic reducing element boron. Once cooled down, the final part 124 is removed from the mold.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of direct metal fabrication (DMF) of metal parts, comprising:

using a carbon precursor to wet a metal powder alloy (X) whose particles are mixed with a eutectic reducing element (A) and bind the particles into a green form part with a specified shape, said particles each having a plurality of grains that are bound together along grain boundaries;

partially reducing the carbon precursor such that a thin carbon (C) film remains whose C=C bonds maintain the part's specified shape and acts as a catalyst causing the eutectic reducing element to become diffusely mobile;

diffusing the eutectic reducing element along the particles' grain boundaries such that the reducing element interacts with the carbon film at the interface between the particles to form organo-metallic bonds C=A that are much stronger than the film's C=C bonds; and initiating supersolidus liquid phase sintering (SLPS) to form a liquid film along the particles' grain boundaries so that the grains slide relative to each other and densify in response to surface tension and capillary pressure to form a final part whose organo-metallic C=A bonds maintain the specified shape.

2. The method of claim 1, wherein the concentration of the eutectic reducing element is sufficient to a) completely diffuse through the grain boundaries of the metal powder alloy, b) react with the carbon to form the organo-metallic bonds, and c) assist SLPS, and the concentration of carbon is sufficient to a) survive the reduction, b) form the thin carbon film and c) react with the eutectic reducing element to form the organo-metallic bonds.

3. The method of claim 2, wherein the eutectic reducing element is small enough to become diffusely mobile along the grain boundaries and is highly reactive with carbon.

4. The method of claim 3, wherein the eutectic reducing element is boron.

5. The method of claim 2, wherein the eutectic reducing element is introduced in a metal powder alloy Y that comprises: (a) the same elemental components which comprise the metal powder alloy X, and (b) the eutectic reducing element in a concentration greater than any concentration of the eutectic element present in the metal powder alloy X.

6. The method of claim 5, wherein the mixture is comprised of 75–85% by volume of alloy X, 5–15% by volume of alloy Y with 0.15–0.5% by weight of element A with the remaining being the carbon precursor.

7. The method of claim 2, wherein the carbon precursor is melted layer-by-layer using selective laser sintering to form the green form part.

8. The method of claim 2, wherein the powder mixture is imprinted onto a substrate carrier using a magnetographic printing process and laminated to form the green form part.

9. The method of claim 2, wherein the powder is mixed in a pre-cast mold to form the green form part.

10. The method of claim 1, wherein the green form part is placed in a furnace and subjected to a thermal cycle that partially reduces the carbon precursor, diffuses the eutectic reducing element, and initiates SLPS.

11. The method of claim 10, wherein in the thermal cycle the temperature of the furnace is
   a) raised from its ambient value to a first temperature range in which the precursor is partially reduced and the carbon film is deposited on the surface of the part;
   b) raised to a second temperature range to initiate grain boundary diffusion of the eutectic reducing element until the reducing element reaches its equilibrium state;
   c) raised to a third temperature range to initiate SLPS; and
   d) cooled to its ambient temperature to complete densification to the final part.

12. The method of claim 11, wherein the first, second, and third temperature ranges are approximately (200–500° C.), (500–1200° C.), and (1200–1300° C.), respectively.

13. The method of claim 11, wherein the green form part is reduced in an environment that is incapable of eliminating all of the carbon from the carbon precursor.

14. The method of claim 2, wherein the concentrations of carbon and the eutectic reducing element in the final part are small enough that the final part exhibits the material quality of the parent metal powder alloy X.

15. A method of direct metal fabrication (DMF) of metal parts, comprising:
   providing a mixture of a polymer (P) having a concentration of carbon (C) and metal powder alloys (X) and (Y) having substantially the same elemental compositions except that alloy Y includes a eutectic reducing element A at a concentration higher than any concentration of said eutectic reducing element A present in alloy X, said X and Y alloys' particles each having a plurality of grains that are bounded together along grain boundaries;
   using the polymer to wet and bind the X and Y alloy particles into a green form part with a specified shape; and
   in a single thermal cycle,
      heating the green form part to partially reduce the polymer so that a thin carbon film remains whose C=C bonds maintain the part's specified shape and acts as a catalyst causing the eutectic reducing element to become diffusely mobile;
      increasing the temperature to accelerate the diffusion of the eutectic reducing element along the grain boundaries of the alloy Y particles, through the carbon film, and along the grain boundaries of the adjacent alloy X particles until equilibrium of element A in the mixture is achieved so that the mixture is a fully homogenized metal powder alloy Z that is held together by the organo-metallic bonds C=A formed when said element A interacts with the carbon film;
      increasing the temperature above a solidus temperature for alloy Z to initiate supersolidus liquid phase sintering (SLPS) where a liquid film forms along the particles' grain boundaries so that the grains slide relative to each other and densify in response to surface tension and capillary pressure to form a final part whose organo-metallic C=A bonds maintain the specified shape, said carbon and eutectic reducing elements constituting such a small portion of said final part that it exhibits the properties of the parent alloy X; and
      cooling the final part to complete densification.

16. The method of claim 15, wherein the concentration of the eutectic reducing element is sufficient to a) completely diffuse through the grain boundaries of the metal powder alloys X and Y, b) react with the carbon at the interface between alloy particles to form a sufficient number of organo-metallic bonds, and c) assist SLPS, and the concentration of carbon is sufficient to a) survive the reduction, b) form the thin carbon film and c) react with the eutectic reducing element to form the organo-metallic bonds.

17. The method of claim 16, wherein the mixture is comprised of 75–85% by volume of alloy X, 5–15% by volume of alloy Y with 0.15–0.5% by weight of element A with the remaining being the polymer.

18. The method of claim 15, wherein the polymer is melted layer-by-layer using selective laser sintering to form the green form part.

19. The method of claim 15, wherein the powder mixture is imprinted onto a carrier using a magnetographic printing process and laminated to form the green form part.

20. The method of claim 15, wherein the powder is mixed in a pre-cast mold to form the green form part.

21. A method of direct metal fabrication (DMF) of metal parts, comprising:
   a) mixing powders of a parent metal, a eutectic reducing element A, and a polymer to form a mixture;
   b) spreading a layer of said mixture on a platform;
   c) directing a beam of energy onto selected areas of said layer to cause localized melting of said polymer, said polymer resolidifying to bind said metal powders in said selected areas;
   d) repeating steps b and c to build up a green form part; and
   e) placing said green form part in a furnace where it is subjected to a thermal cycle that f) partially reduces the polymer leaving a thin carbon film whose C=C bonds maintain the part's specified shape and act as a catalyst causing the eutectic reducing element to become diffusely mobile, g) accelerates the diffusion of the eutectic reducing element along the grain boundaries of the adjacent parent metal particles to form organo-metallic bonds C=A, h) initiates supersolidus liquid phase sintering (SLPS) to densify the powder into a final part whose organo-metallic C=A bonds maintain the specified shape, and i) cools the final part to complete densification.

22. The method of claim 21, wherein the concentration of the eutectic reducing element is sufficient to a) completely diffuse through the grain boundaries of the metal powder alloy, b) react with the carbon to form the organo-metallic bonds, and c) assist SLPS and the concentration of carbon is sufficient to a) survive the reduction, b) form the thin carbon film and c) react with the eutectic reducing element to form the organo-metallic bonds.

23. The method of claim 22, wherein the eutectic reducing element is introduced in a metal powder alloy (Y) that comprises:
   (a) the same elemental components which comprise the parent metal powder, and
   (b) the eutectic reducing element in a concentration greater than any concentration of said eutectic element present in the parent metal powder.

24. The method of claim 23, wherein the mixture is comprised of 75–85% by volume of the parent metal, 5–15% by volume of alloy Y with 0.15–0.5% by weight of element A with the remaining being the polymer.

25. A method of direct metal fabrication of metal parts, comprising:
   a) mixing powders of a parent metal, a eutectic reducing element A, and a polymer to form a mixture;
   b) feeding the mixture to a magnetographic printer that sequentially prints latent images formed from said mixture onto respective sheets of a thermally activated substrate carrier as it moves through the printer;
   c) cutting the next sheet off said substrate carrier;
   d) registering and laminating each successive sheet on top of the previous sheet to buildup a green form part layer-by-layer; and
   e) placing said green form part in a furnace where it is subjected to a thermal cycle that f) partially reduces the polymer leaving a thin carbon film whose C=C bonds maintain the part's specified shape and act as a catalyst causing the eutectic reducing element to become diffusely mobile, g) accelerates the diffusion of the eutectic reducing element along the grain boundaries of the adjacent parent metal particles to form organo-metallic bonds C=A, h) initiates supersolidus liquid phase sintering (SLPS) to densify the powder into a final part whose organo-metallic C=A bonds maintain the specified shape, and i) cools the final part to complete densification.

26. The method of claim 25, wherein the concentration of the eutectic reducing element is sufficient to a) completely diffuse through the grain boundaries of the metal powder alloy, b) react with the carbon to form a sufficient number of organo-metallic bonds, and c) assist SLPS and the concentration of carbon is sufficient to a) survive the reduction, b) form the thin carbon film and c) react with the eutectic reducing element to form the organo-metallic bonds.

27. The method of claim 26, wherein the eutectic reducing element is introduced in a metal powder alloy (Y) that comprises:
   (a) the same elemental components which comprise the parent metal powder, and
   (b) the eutectic reducing element in a concentration greater than any concentration of said eutectic element present in the parent metal powder.

28. The method of claim 27, wherein the mixture is comprised of 75–85% by volume of the parent metal, 5–15% by volume of alloy Y with 0.15–0.5% by weight of element A with the remaining being the polymer.

29. The method of claim 25, wherein the substrate carrier comprises a polymer material that contributes carbon to the formation of the carbon film and the organo-metallic bonds.

30. The method of claim 25, wherein the magnetographic printer comprises:
   a rotating drum;
   a static writing head array that transfers an electronic latent image from a CAD file onto the rotating drum in the form of a magnetic latent image;
   a powder feeder that feeds the mixture to the rotating drum so that it is transferred to the magnetic latent image;
   a hot roller that thermally activates the substrate carrier and draws in past the rotating drum so that the mixture in the form of the latent image is transferred onto the next sheet of the substrate carrier;
   an erasing bar that magnetical erases the magnetic latent image from the drum after the mixture has been transferred to the substrate carrier; and
   a cold roller that thermally deactivates the substrate carrier so that it can be cut and laminated into the green form part.

31. A method of direct metal fabrication (DMF) of metal parts, comprising:
   a) providing a master mold for a green form part;
   b) mixing a metal powder alloy comprising alloy X particles and a eutectic reducing element with a polymer resin that wets and binds the particles in said mold to form the green form part;
   c) placing said mold in a furnace where it is subjected to a thermal cycle that f) partially reduces the polymer resin leaving a thin carbon film whose C=C bonds maintain the part's specified shape and acts as a catalyst causing the eutectic reducing element to become diffusely mobile, g) accelerates the diffusion of the eutectic reducing element along the grain boundaries of the adjacent alloy X particles to form organo-metallic bonds C=A, h) initiates supersolidus liquid phase sintering (SLPS) to densify the powder into a final part whose organo-metallic C=A bonds maintain the specified shape, and i) cools the final part to complete densification; and
   j) removing the final part from the mold.

32. The method of claim 31, wherein said master mold is formed using a rapid prototype manufacturing (RM) process.

33. The method of claim 31, wherein said final part has the material quality of the metal powder alloy.

34. The method of claim 31, wherein the green form part is reduced in an environment in said furnace that is incapable of eliminating all of the carbon in said polymer resin.

35. The method of claim 31, wherein the concentration of the eutectic reducing element is sufficient to a) completely diffuse through the grain boundaries of the metal powder alloy, b) react with the carbon to form a sufficient number of organo-metallic bonds, and c) assist SLPS and the concentration of carbon is sufficient to a) survive the reduction, b) form the thin carbon film and c) react with the eutectic reducing element to form the organo-metallic bonds.

36. The method of claim 35, wherein the eutectic reducing element is introduced in a metal powder alloy (Y) which comprises:
   (a) the same elemental components which comprise alloy X, and
   (b) the eutectic reducing element in a concentration greater than any concentration of said eutectic element present in alloy X.

* * * * *